United States Patent
Li et al.

(10) Patent No.: US 12,499,912 B2
(45) Date of Patent: Dec. 16, 2025

(54) METHOD AND APPARATUS FOR TEMPLATE RECOMMENDATION, DEVICE, AND STORAGE MEDIUM

(71) Applicant: Beijing Zitiao Network Technology Co., Ltd., Beijing (CN)

(72) Inventors: Gen Li, Beijing (CN); Wozhou He, Beijing (CN); Xinglong Wu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/537,529

(22) Filed: Dec. 12, 2023

(65) Prior Publication Data

US 2024/0112702 A1    Apr. 4, 2024

Related U.S. Application Data

(63) Continuation of application No. PCT/CN2022/100519, filed on Jun. 22, 2022.

(30) Foreign Application Priority Data

Jun. 24, 2021  (CN) .......................... 202110703796.7

(51) Int. Cl.
 *G11B 27/031*  (2006.01)
 *H04L 67/306*  (2022.01)

(52) U.S. Cl.
 CPC .......... *G11B 27/031* (2013.01); *H04L 67/306* (2013.01)

(58) Field of Classification Search
 CPC .. G11B 27/031; H04L 67/306; H04N 21/854; H04N 21/81; G06F 40/186; G06F 16/435; G06F 16/483
 (Continued)

(56) References Cited

U.S. PATENT DOCUMENTS

2007/0104341 A1* 5/2007 Kondo ...................... G06T 7/70
                                                      381/388
2018/0067692 A1   3/2018 Oh
(Continued)

FOREIGN PATENT DOCUMENTS

CN    105204850 A    12/2015
CN    106303354 A    1/2017
(Continued)

OTHER PUBLICATIONS

English Translation of Chinese Publication CN111105819 May 2020 (Year: 2020).*
(Continued)

*Primary Examiner* — Loi H Tran
(74) *Attorney, Agent, or Firm* — Astute IP Law Group

(57) ABSTRACT

The present disclosure provides a template recommendation method and apparatus, a device, and a storage medium. The method comprises: first, obtaining a feature of a multimedia material to be processed; then, determining a similarity between the feature corresponding to said multimedia material and a feature corresponding to a candidate editing template; and in response to determining that the similarity satisfies a preset matching condition, determining the candidate editing template as a target editing template corresponding to said multimedia material.

18 Claims, 2 Drawing Sheets

(58) Field of Classification Search
USPC .......................................................... 386/278
See application file for complete search history.

(56) References Cited

U.S. PATENT DOCUMENTS

| | | | | |
|---|---|---|---|---|
| 2018/0167692 | A1* | 6/2018 | Kedenburg, III | .... H04N 21/482 |
| 2021/0026886 | A1* | 1/2021 | Song | ................... G06F 16/7867 |
| 2021/0124977 | A1 | 4/2021 | Panetta et al. | |
| 2022/0005508 | A1* | 1/2022 | Huang | ................. G11B 27/031 |
| 2022/0044026 | A1* | 2/2022 | Huang | ................. G11B 27/034 |
| 2023/0127373 | A1* | 4/2023 | Wang | .............. H04N 21/44008 |
| | | | | 386/285 |

FOREIGN PATENT DOCUMENTS

| | | |
|---|---|---|
| CN | 110602546 A | 12/2019 |
| CN | 110659388 A | 1/2020 |
| CN | 110855904 A | 2/2020 |
| CN | 110990610 A | 4/2020 |
| CN | 111105819 A | 5/2020 |
| CN | 111243632 A | 6/2020 |
| CN | 111246300 A | 6/2020 |
| CN | 111597443 A | 8/2020 |
| CN | 112203140 A | 1/2021 |
| CN | 112445970 A | 3/2021 |
| CN | 112449231 A | 3/2021 |
| CN | 112565825 A | 3/2021 |
| CN | 112637675 A | 4/2021 |
| JP | 2019-220098 A | 12/2019 |
| JP | 7697763 B2 | 6/2025 |
| WO | 2019245033 A1 | 12/2019 |

OTHER PUBLICATIONS

International Search Report in PCT/CN2022/100519, mailed Sep. 20, 2022, 4 pages.

Office Action for Japanese Patent Application No. 2023-577115, mailed on Nov. 8, 2024, 10 pages.

Yujia et al., "Computational Product Presentation Video Editing Framework Based on Editing Attribute Constraints", Journal of Computer-Aided Design & Computer Graphics, vol. 32, No. 7, Jul. 2020, 10 pages, with English Abstract.

Search Report to Chinese Patent Application No. 202110703796.7, 2 pages.

Decision to Grant for Japanese Patent Application No. 2023-577115, mailed on May 13, 2025, 5 pages.

Kant et al., "Fuzzy logic based similarity measure for multimedia contents recommendation", Multimedia tools and applications, vol. 78, Dec. 13, 2017, 11 pages.

Qi et al., "China's Intelligent Media Ecological Structure, Application Innovation and Key Trends", News and Writing, Issue 08, Aug. 5, 2020, 9 pages, with English Abstract.

Second Office Action for Chinese Application No. 202110703796.7, mailed Dec. 12, 2024, 20 Pages.

Fourth Office Action for Chinese Patent Application No. 202110703796.7, mailed on May 20, 2025, 25 pages.

\* cited by examiner

METHOD AND APPARATUS FOR TEMPLATE RECOMMENDATION, DEVICE, AND STORAGE MEDIUM

CROSS-REFERENCE TO RELATED APPLICATION(S)

The present application is a Continuation application of International Patent Application No. PCT/CN2022/100519, filed on Jun. 22, 2022 which claims priority to Chinese patent application No. 202110703796.7, entitled "template recommendation method and apparatus, device and storage medium", filed on Jun. 24, 2021, the contents of which are hereby incorporated by reference in their entireties.

FIELD

The present disclosure relates to the field of data processing, and more specifically, to a method and apparatus for template recommendation, device, and storage medium.

BACKGROUND

With the development of computer technology, users' requirements for multimedia material processing get increasingly high, and meanwhile, their willingness to actively participate in processing multimedia materials becomes stronger and stronger.

However, since most users are not specialized enough in processing multimedia materials, editing templates for multimedia material processing have been created at the right moment. Users can actively select editing templates and multimedia materials to generate multimedia works with one click. Apparently, this lowers the threshold of multimedia material processing, and at the same time, such a simple and convenient mode of generating multimedia works is widely embraced by users.

In practical applications, editing templates that users may select are usually templates that have been used more frequently in the recent past, i.e., editing templates with a high degree of popularity. However, those highly popular editing templates are not necessarily applicable to multimedia materials selected by users, which leads to the failure of multimedia work generation and further reduces users' use experience.

To this end, it is an urgent technical problem regarding how to recommend an editing template for a user that is applicable to a multimedia material selected by the user and to improve the user's satisfaction with editing template recommendation.

SUMMARY

To solve or at least in part solve the foregoing technical problem, the present disclosure provides a template recommendation method, apparatus, device and storage medium.

In a first aspect, the present disclosure provides a method for template recommendation, the method comprising: obtaining a feature of a multimedia material to be processed, wherein the feature includes a content feature of the multimedia material to be processed and/or a user attribute corresponding to the multimedia material to be processed; determining a similarity between the feature corresponding to the multimedia material to be processed and a feature corresponding to a candidate editing template, wherein the feature corresponding to the candidate editing template is determined based on historical multimedia works, and historical multimedia works are multimedia works edited in an editing mode applied by the candidate editing template; and in response to determining that the similarity satisfies a preset matching condition, determining the candidate editing template as a target editing template corresponding to the multimedia material to be processed, wherein the target editing template is applied to edit the multimedia material to be processed into a target multimedia work in the editing mode.

In an optional implementation, before determining the similarity between the feature corresponding to the multimedia material to be processed and the feature corresponding to a candidate editing template, the method further comprises: determining the candidate editing template, and obtaining a multimedia work collection corresponding to the candidate editing template, wherein the multimedia work collection comprises more historical multimedia works than a preset number; and determining the feature corresponding to the candidate editing template based on content features of historical multimedia works in the multimedia work collection and/or user attributes corresponding to the historical multimedia works.

In an optional implementation, determining the feature corresponding to the candidate editing template based on content features of the historical multimedia works in the multimedia work collection and/or user attributes corresponding to the historical multimedia works comprises: determining a target tag, wherein the target tag characterizes content features of historical multimedia works in the multimedia work collection and/or user attributes corresponding to the historical multimedia works; determining a proportion of historical multimedia works having the target tag in a multimedia work collection corresponding to the candidate editing template; determining a ratio of the proportion to an average proportion corresponding to the target tag as a feature value of the candidate editing template in a dimension of the target tag, wherein the feature value is characterizes an applicability degree of the candidate editing template in the dimension of the target tag, and the average proportion represents an average value of proportions of historical multimedia works having the target tag in multimedia work collections corresponding to respective templates in a preset template recommendation pool; and building a template feature vector corresponding to the candidate editing template based on the feature value of the candidate editing template in the dimension of the target tag.

In an optional implementation, before building the template feature vector corresponding to the candidate editing template based on the feature value of the candidate editing template in the dimension of the target tag, the method further comprises: determining a distribution smoothness degree of feature values of respective templates in the preset template recommendation pool in the dimension of the target tag, wherein the distribution smoothness degree characterizes a difference degree among the respective templates in the preset template recommendation pool in the dimension of the target tag; and determining top K target tags with lower distribution smoothness degrees as recommended standard tags, wherein K is an integer greater than 0; and wherein the building the template feature vector corresponding to the candidate editing template based on the feature value of the candidate editing template in the dimension of the target tag comprises: building the template feature vector corresponding to the candidate editing template based on a feature value of the candidate editing template corresponding to the recommended standard tags.

In an optional implementation, the obtaining the feature of the multimedia material to be processed comprises: determining the feature value of a multimedia material to be processed in a dimension of the recommended standard tags based on a tag of the multimedia material to be processed; and determining a feature vector corresponding to the multimedia material to be processed based on the feature value of the multimedia material to be processed in the dimension of the recommended standard tags; and wherein the determining the similarity between the feature corresponding to the multimedia material to be processed and the feature corresponding to the candidate editing template comprises: calculating a similarity between the feature vector corresponding to the multimedia material to be processed and the template feature vector corresponding to the candidate editing template.

In an optional implementation, before the determining the similarity between the feature corresponding to the multimedia material to be processed and the feature corresponding to the candidate editing template, the method further comprises: filtering templates in a preset template recommendation pool based on attribute information of the multimedia material to be processed to obtain a candidate editing template, wherein the attribute information comprises material type, material amount, material duration and/or material aspect ratio.

In an optional implementation, the method is applied on a client, and after in response to determining that the similarity satisfies the preset matching condition, determining the candidate editing template as the target editing template corresponding to the multimedia material to be processed, the method further comprises: editing the multimedia material to be processed in an editing mode applied by the target editing template to obtain the target multimedia work.

In an optional implementation, the target editing template comprises a plurality of candidate editing templates, and before the editing the multimedia material to be processed in the editing mode applied by the target editing template to obtain the target multimedia work, the method further comprises: presenting the plurality of candidate editing templates; and wherein the editing the multimedia material to be processed in the editing mode applied by the target editing template to obtain the target multimedia work comprises: in response to performing the selection operation on any one of the plurality of candidate editing template, editing the multimedia material to be processed in an editing mode applied by a template corresponding to the selection operation to obtain the target multimedia work.

In a second aspect, the present disclosure further provides an apparatus for template recommendation, comprising: a feature determining module, configured for obtaining a feature of a multimedia material to be processed, wherein the feature comprises a content feature of the multimedia material to be processed and/or a user attribute corresponding to the multimedia material to be processed; a similarity determining module, configured for determining a similarity between the feature corresponding to the multimedia material to be processed and a feature corresponding to a candidate editing template, wherein the feature corresponding to the candidate editing template is determined based on historical multimedia works, and the historical multimedia works are multimedia works edited in the editing mode applied by the candidate editing template; and a template determining module, configured for, in response to determining that the similarity satisfies a preset matching condition, determine the candidate editing template as a target editing template corresponding to the multimedia material to be processed, wherein the target editing template is applied to edit the multimedia material to be processed into a target multimedia work in the editing mode.

In a third aspect, the present disclosure provides a computer readable storage medium in which instructions are stored, the instructions, when running on a terminal device, causing the terminal device to perform the method described above.

In a fourth aspect, the present disclosure provides an electronic device, the electronic device comprising: a processor; a memory, for storing instructions executable by the processor; the processor being configured to read the executable instructions from the memory and execute the instructions to perform the method described above.

In a fifth aspect, the present disclosure provides a computer program product, comprising a computer program/instructions which, when executed by a processor, perform the method described above.

With the template recommendation method provided by the embodiments of the present disclosure, a target editing template corresponding to a multimedia material to be processed is determined by calculating a similarity between a feature corresponding to the multimedia material to be processed and a feature corresponding to a candidate editing template. Since the similarity between the feature of the multimedia material to be processed and the feature of the candidate editing template can characterize a degree of match between the multimedia material to be processed and the candidate editing template, the candidate editing template whose similarity satisfies a preset matching condition is determined as the target editing template, thereby increasing the degree of match between the target editing template and the multimedia material to be processed and further improving the user satisfaction with template recommendation.

BRIEF DESCRIPTION OF THE DRAWINGS

Through the more detailed description of detailed implementations with reference to the accompanying drawings, the above and other features, advantages and aspects of respective embodiments of the present disclosure will become more apparent. The same or similar reference numerals represent the same or similar elements throughout the figures. It should be understood that the figures are merely schematic, and components and elements are not necessarily drawn to scale. Among the figures.

DETAILED DESCRIPTION OF EMBODIMENTS

The embodiments of the present disclosure will be described in more detail with reference to the accompanying drawings, in which some embodiments of the present disclosure have been illustrated. However, it should be understood that the present disclosure can be implemented in various manners, and thus should not be construed to be limited to embodiments disclosed herein. On the contrary, those embodiments are provided for the thorough and complete understanding of the present disclosure. It should be understood that the drawings and embodiments of the present disclosure are only used for illustration, rather than limiting the protection scope of the present disclosure.

It should be understood that various steps described in method implementations of the present disclosure may be performed in different order and/or in parallel. Furthermore, method implementations may include additional steps and/or omit steps that are shown. The scope of the present disclosure is not limited in this regard.

The terms "comprise" and its variants used herein are to be read as open terms that mean "include, but is not limited to." The term "based on" is to be read as "based at least in part on." The term "one embodiment" is to be read as "at least one embodiment," the term "another embodiment" is to be read as "at least one another embodiment," and the term "some embodiments" is to be read as "at least some embodiments." Other definitions might be included below.

It should be noted that concepts "first," "second" and the like mentioned in the present disclosure are only used to distinguish between different apparatuses, modules or units, rather than limiting the order or interdependence of the functions performed by these apparatuses, modules or units.

It should be noted that modifications "one" and "more" mentioned in the present disclosure are schematic and not limiting, and should be understood as "one or more" to those skilled in the art unless otherwise specified.

Names of messages or information exchanged between the plurality of apparatuses in implementations of the present disclosure are used for illustrative purposes only and are not intended to limit the scope of those messages or information.

Figure 1:
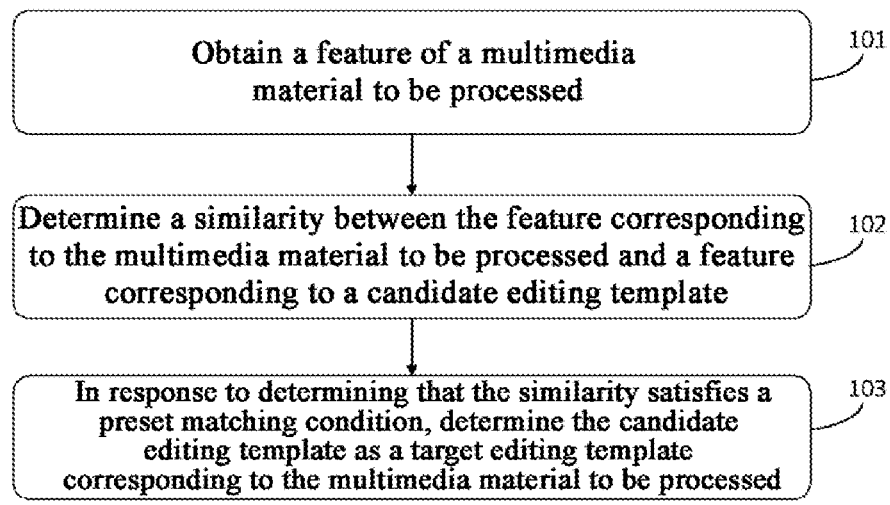
FIG. 1 is a schematic flowchart of a method for template recommendation provided by an embodiment of the present disclosure.

FIG. 1 is a schematic flowchart of a method for template recommendation provided by an embodiment of the present disclosure. The method may be performed by an apparatus for template recommendation, where the apparatus may be implemented in software and/or hardware and may generally be integrated into an electronic device.

As depicted, the method for template recommendation may include the following:

At step 101, a feature of a multimedia material to be processed is obtained, where the feature includes a content feature of the multimedia material to be processed and/or a user attribute corresponding to the multimedia material to be processed.

The multimedia material to be processed refers to a multimedia material demanding to be processed. In different application scenarios, the number of the multimedia material to be processed may differ, and the type of the multimedia material to be processed may also differ, where the type of the multimedia material to be processed may include, but is not limited to, any one of more of video, image, and audio.

In an optional implementation, the multimedia material to be processed may include any one or more material types of video, image, and audio, and the number of each type of material is not limited.

Since the material content of a multimedia material to be processed itself may characterize a feature of the multiple material to be processed, a content feature of the multimedia material to be processed may be extracted based on the material content of the multimedia material to be processed as a feature of the multimedia material to be processed. The content feature may characterize the feature of the multimedia material to be processed from the dimension of the content of the multimedia material to be processed. Specifically, the content feature may be obtained by analyzing the content of the multimedia material to be processed, where the content feature includes, but is not limited to, any one or more of scenery, food, sports, and baby.

It may be understood that the multimedia material to be processed may include a portrait. Therefore, the content feature may further include a character attribute feature in the multimedia material to be processed, and the character attribute feature may be obtained by methods such as face attribute analysis. The present embodiment is not intended to limit the character attribute feature, for example, age group, gender, expression, and number of persons may all be used as character attribute features. For example, by performing face attribute analysis on the multimedia material to be processed, if the multimedia material to be processed is determined to include 2 persons, then a feature "2 persons" may be added to the content feature; if the multimedia material to be processed is determined to include a baby, then a feature "baby" may be added to the content feature.

In addition, users who select the multimedia material to be processed usually expect the recommendation of templates that match their preferences. Therefore, the embodiment of the present disclosure also uses a feature of the user who selects the multimedia material to be processed as the feature of the multimedia material to be processed, for use in constituting a user attribute of the multimedia material to be processed. Specifically, the user attribute characterizes the feature of the multimedia material to be processed in the dimension of the user attribute of the user who selects the multimedia material to be processed. Specifically, the user attribute may be obtained by analyzing the user who selects the multimedia material to be processed, where the user attribute includes, but is not limited to, one or more of user age, user gender, user occupation and user preferences. For example, if the user who selects the multimedia material to be processed is a female, then a user attribute "female" may be added to the multimedia material to be processed.

It may be understood that the feature of the multimedia material to be processed may be related to the behavior that the user selects the multimedia material to be processed. For example, when the user selects the multimedia material to be processed for generating a multimedia work during a holiday, an editing template is usually recommended to the user, taking into account features of the holiday. Therefore, the embodiment of the present disclosure may further use the time of selecting the multimedia material to be processed as the feature of the multimedia material to be processed, for use in recommending an editing template to the user.

In an optional implementation, the feature of the multimedia material to be processed may be represented by a corresponding feature vector. A method for determining the feature vector will be introduced in the following embodiment and thus is not detailed here.

At step 102, a similarity between the feature of the multimedia material to be processed and a feature corresponding to a candidate editing template is determined, where the feature corresponding to the candidate editing template is determined based on historical multimedia works, and the historical multimedia works are multimedia works edited in an editing mode indicated in the candidate editing template.

The candidate editing template refers to an editing template selectable to process the multimedia material to be processed. Usually, each candidate editing template corresponds to one or more historical multimedia works to which the template has been applied.

It may be understood that historical multimedia works to which the same candidate editing template has been applied usually contain a similar feature. Therefore, the feature corresponding to the candidate editing template may be determined based on historical multimedia works to which the same candidate editing template has been applied, where the feature may characterize a feature of a multimedia work to which the corresponding candidate editing template is applicable, and also may characterize a feature of the candidate editing template from the perspective of the application scenario for the editing template.

Like the feature of the multimedia material to be processed, in an optional implementation, the feature corresponding to the candidate editing template may be represented by a corresponding feature vector. A method for determining the feature vector will be introduced in the following embodiment and thus is not detailed here.

In the embodiment of the present disclosure, in order to obtain a candidate editing template having a higher degree of match with the multimedia material to be processed, an editing template is recommended for the multimedia material to be processed based on a feature similarity between the multimedia material to be processed and the candidate editing template, where the method for determining the similarity may be selected according to a specific application scenario, and the present embodiment is not intended to limit.

At step 103, in response to determining that the similarity satisfies a preset matching condition, the candidate editing template is determined as a target editing template corresponding to the multimedia material to be processed, where the target editing template is applied to edit the multimedia material to be processed to into a target multimedia work in the editing mode.

It may be understood that the higher the value of the similarity, the higher degree of match between the corresponding candidate editing template and the multimedia material to be processed; and on the contrary, the lower the value of the similarity, the lower degree of match between the corresponding candidate editing template and the multimedia material to be processed. Therefore, in the embodiment of the present disclosure, a matching condition may be preset which is used for filtering candidate editing templates, and a target editing template corresponding to the multimedia material to be processed is determined based on whether the similarity between the feature corresponding to the multimedia material to be processed and the feature corresponding to the candidate editing template satisfies the preset matching condition. The preset matching condition may be greater than a preset similarity threshold, etc., and the number of the target editing templates may be one or more, each target editing template corresponding to a respective editing mode. There are a plurality of operations that may be performed on the multimedia material to be processed in the editing mode, including without limitation to, one or more of adding filters, switching scenes and adding music. The target editing template is applied to edit the multimedia material to be processed to into a target multimedia work in the preset editing mode.

It should be noted that there may be various ways of determining the target editing template, which may be selected according to an application scenario. The present embodiment is not intended to limit. For example, there exist the following two methods:

Method 1: in the embodiment of the present disclosure, all similarities obtained by the calculation may be ranked in a descending order, and top N candidate editing templates may be used as the target editing templates corresponding to the multimedia material to be processed.

Method 2: in the embodiment of the present disclosure, all similarities obtained by the calculation may be ranked in a descending order, and N candidate editing templates may be randomly selected, from the M candidate editing templates, as the target editing templates. Generally speaking, several candidate editing templates with the highest values of the similarity have a higher likelihood of having similar styles, so this method can enrich the styles of the target editing templates displayed to the user and improve the user experience.

The method for template recommendation provided by the embodiment of the present disclosure determines the target editing template corresponding to the multimedia material to be processed by calculating the similarity between the feature corresponding to the multimedia material to be processed and the feature corresponding to the candidate editing template. Since the similarity between the feature of the multimedia material to be processed and the feature of the candidate editing template may characterize the degree of match between the multimedia material to be processed and the candidate editing template, determining the candidate editing template whose similarity satisfies the preset matching condition as the target editing template can increase the degree of match between the target editing template and the multimedia material to be processed, thereby improving the user's satisfaction with template recommendation.

In addition, the embodiment of the present disclosure may recommend different target editing templates for multimedia materials to be processed with different features, thereby avoiding the unitary recommendation of more popular templates to all users and making the template recommendation more diversified.

Based on the foregoing embodiment, a feature corresponding to the candidate editing template is first determined before determining the similarity between the feature corresponding to the multimedia material to be processed and the feature corresponding to the candidate editing template.

Figure 2:
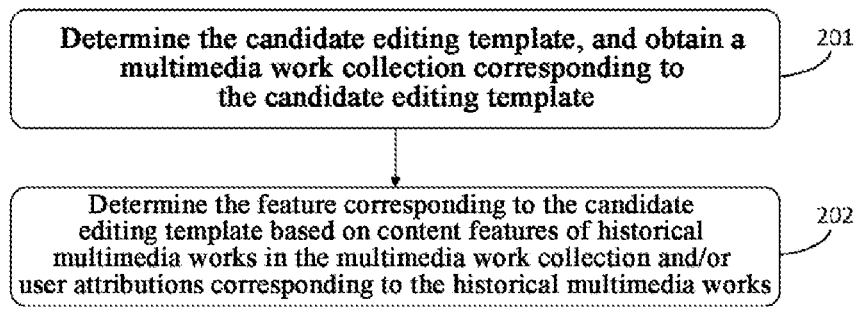
FIG. 2 is a schematic flowchart of a method for determining a feature of a candidate editing template provided by an embodiment of the present disclosure.

To better illustrate the method for determining the feature corresponding to the candidate editing template, reference may be made to FIG. 2, which is a schematic flowchart of a method for determining a feature of a candidate editing template provided by an embodiment of the present disclosure.

At step 201, a candidate editing template is determined, and a multimedia work collection corresponding to the candidate editing template is obtained, where the multimedia work collection comprises more historical multimedia works than a preset number.

It should be noted that the target editing template recommended to the user may be determined from a preset template recommendation pool based on the similarity with the multimedia material to be processed. In order to improve the quality of the target editing template recommended to the user, in the embodiment of the present disclosure, templates in the preset template recommendation pool may be filtered so as to determine the candidate editing template in the embodiment of the present disclosure.

It should be noted that the multimedia work collection comprises historical multimedia works, and historical multimedia works in the same multimedia work collection are processed using the same candidate editing template.

There are various methods of filtering templates in the preset template recommendation pool to determine the candidate editing template, which may be selected according to a specific application scenario. The present embodiment is not intended to limit. For example, there exist the following two methods:

Method 1: in the embodiment of the present disclosure, a template may be filtered by the number of historical multimedia works corresponding to the templates in the preset template recommendation pool. Specifically, an integer Z may be preset, where a value of Z may be set corresponding to a specific application scenario. A multimedia work collection corresponding to the template is obtained, and the number of historical multimedia works in the multimedia work collection is greater than Z, the template passes the filtering and may be used as a candidate editing template.

Method 2: in the embodiment of the present disclosure, a template may be filtered by the number of historical multimedia works corresponding to the templates in the preset template recommendation pool and the playing number of each historical multimedia work. Specifically, integers Y and Z may be preset, where values of Z and Y may be set corresponding to a specific application scenario. A multimedia work collection corresponding to the template is obtained, and the number of historical multimedia works which have been played more than Y times in the multimedia work collection is determined. When the number of historical multimedia works is greater than Z, the template passes the filtering and may be used as a candidate editing template.

It may be understood that in order to avoid the unitary recommendation of target editing templates to users, in an optional implementation, the candidate editing templates which have been filtered may further be filtered, so as to make the distribution of types of target editing templates recommended to users more even. For example, the candidate editing template may further be filtered based on a template type, and X candidate editing templates may be selected from each template type as final candidate editing templates, wherein X is an integer.

At step 202, the feature corresponding to the candidate editing template is determined based on a content feature of the historical multimedia work in the multimedia work collection and/or a user attribute corresponding to the historical multimedia work.

It may be understood that the feature of the historical multimedia work in the multimedia work collection may comprise: a content feature of the historical multimedia work and/or a user attribute corresponding to a creator of the historical multimedia work.

The content feature may characterize the feature of the multimedia work in the dimension of the material content. Specifically, the content feature may be obtained by analyzing the content of the multimedia work, wherein the content feature includes, but is not limited to, any one or more of scenery, food, sports and baby.

It may be understood that the historical multimedia work may include a portrait. Thus, the content feature may further include a character feature of the historical multimedia work, and the character feature may be obtained by methods such as face attribute analysis. The present embodiment is not intended to limit the character feature, for example, age group, gender, expression, and number of persons may all be used as character features. For example, by performing face attribute analysis on the historical multimedia work, if the historical multimedia work is determined to include 2 persons, then a feature "2 persons" may be added to the content feature; if the historical multimedia work is determined to include a baby, then a feature "baby" may be added to the content feature.

The user attribute corresponding to the creator of the historical multimedia work may characterize the feature of the historical multimedia work in the dimension of the user attribute of the user who releases the multimedia work. Specifically, the user attribute may be obtained by analyzing the user attribute of the user who releases the historical multimedia work, where the user attribute includes, but is not limited to, one or more of author age, author gender, author occupation and author preferences.

It may be understood that the feature of the historical multimedia work may be related to the behavior that the user releases the historical multimedia work. For example, when the user releases the historical multimedia work during a holiday, a template is usually selected taking into account features of the holiday. Therefore, the embodiment of the present disclosure may further use the time of releasing the historical multimedia work as the feature of the historical multimedia work.

It should be noted that the feature of the historical multimedia work to which a candidate editing template is applied may characterize the feature of the candidate editing template. Therefore, the feature of the historical multimedia work in the multimedia work collection corresponding to a candidate editing template may characterizes the feature of the candidate editing template.

In the embodiment of the present disclosure, the historical multimedia work may have a tag, and the tag characterizes a content feature of the historical multimedia work and/or a user attribute corresponding to the creator of the historical multimedia work. Based on the tag of the historical multimedia work in the multimedia work collection, a template feature vector corresponding to the candidate editing template may be determined, the template feature vector characterizes the feature of the candidate editing template. The method for determining may be selected according to a specific application scenario, and the present embodiment is not intended to limit. For example, there exist the following two methods:

Method 1: according to the tag of the historical multimedia work, feature vectors of respective historical multimedia works are determined, and then an average value of the feature vectors of the respective historical multimedia works is calculated as a template feature vector corresponding to the candidate editing template. Specific calculation is not detailed here.

Method 2: the method may be implemented based on the following steps 1-4, including the following:

At step 1, a target tag is determined, where the target tag characterizes a content feature of a historical multimedia work in the multimedia work collection and/or a user attribute corresponding to the historical multimedia work.

In the embodiment of the present disclosure, the template feature vector corresponding to the candidate editing template may include feature values in multiple dimensions, where each dimension of the template feature vector has a corresponding relation with a specific tag, and a feature value of the each dimension characterizes the matching of the corresponding tag with respect to the candidate editing template. The higher the feature value, the higher the matching between the multimedia material to be processed with the corresponding tag and the candidate editing template.

In practical applications, before determining the template feature vector corresponding to the candidate editing template, tags having a corresponding relation to respective dimensions of the template feature vector is first determined as target tags respectively.

At step 2, the proportion of historical multimedia works with the target tags in the multimedia work collection corresponding to the candidate editing template is determined.

In the embodiment of the present disclosure, after obtaining a multimedia work collection corresponding to the candidate editing template, tags of respective historical multimedia works in the multimedia work collection are determined, and then based on the tags of the respective historical multimedia works, the proportion of historical multimedia works with the target tags in the multimedia work collection is determined. For example, if the target tag is "baby," and the number of historical multimedia works with the tag "baby" in the multimedia work collection corresponding to the candidate editing template is determined as 1000, while the total number of historical multimedia works in the multimedia work collection is 10000, then the proportion of historical multimedia works with the tag "baby" is 10%.

It may be understood that the proportion of historical multimedia works with the target tag may characterize the significance of the target tag with respect to the candidate editing template. If most of historical multimedia works to which the candidate editing template is applied have the tag "baby," it means that the tag "baby" has great significance with respect to the candidate editing template.

At step 3, the ratio of the proportion to an average proportion corresponding to the target tag is determined as the feature value of the candidate editing template in the dimension of the target tag, where the feature value characterizes an applicability degree of the candidate editing template in the dimension of the target tag, and the average proportion represents an average value of the proportion of historical multimedia works with the target tag in the multimedia work collection corresponding to respective templates in the preset template recommendation pool.

In the embodiment of the present disclosure, the preset template recommendation pool may be built in advance, where the template recommendation pool includes a template determined based on the number of historical multimedia works corresponding to the template, a like count of historical multimedia works, a playback count of historical multimedia works and other information. The average proportion corresponding to the target tag in the embodiment of the present disclosure may be used for representing an average significance degree of the target tag with respect to all templates in the preset template recommendation pool.

Specifically, a method for calculating the average proportion corresponding to the target tag may be: with respect to templates in the preset template recommendation pool, obtaining the proportion of historical multimedia works with the target tag in the multimedia work collection corresponding to all the templates as the average proportion. Or, an average value of the proportion of historical multimedia works with the target tag in the multimedia work collection corresponding to each template may be calculated as the average proportion corresponding to the target tag. Other methods of calculating the average proportion of the target tag are not explained here.

In order to characterize the applicability degree of the target tag with respect to the candidate editing template, the embodiment of the present disclosure uses the ratio of the proportion of historical multimedia works with the target tag in the multimedia work collection corresponding to the candidate editing template to the average proportion corresponding to the target tag as the feature value of the candidate editing template in the dimension of the target tag.

For example, when the target tag is "baby," the proportion of the tag "baby" among historical multimedia works using the candidate editing template is 10%, while the average proportion of the tag "baby" among historical multimedia works corresponding to all templates in the preset template recommendation pool is 2%. It means that the tag "baby" has a great significance with respect to the candidate editing template. Therefore, the feature value of the candidate editing template in the dimension "baby" of the target tag is $10\%+2\%=5$.

At step 4, a template feature vector corresponding to the candidate editing template is built based on the feature value of the candidate editing template in the dimension of the target tag.

It may be understood that each dimension in the template feature vector has a corresponding relation with a tag. After determining the feature value corresponding to each tag, the template feature vector corresponding to the candidate editing template is built based on the feature value corresponding to the each tag.

In the embodiment of the present disclosure, the feature value of the target tag is determined by the ratio of the proportion to the average proportion, so that the difference between the templates may be reflected more clearly.

In the embodiment of the present disclosure, before step 4, the tag corresponding to each dimension may be filtered based on the distribution smoothness degree of the feature value of the dimension. It may be understood that with respect to all templates, the distribution smoothness degree of the feature value of the target tag may characterize the difference degree of each template with respect to the target tag. In other words, a tag with slight difference between respective templates may be filtered out based on the distribution smoothness degree of the feature value, so that the remaining tag can more vividly characterize the difference between respective templates, further facilitating template recommendation. Meanwhile, by filtering tags, the dimensionality of the template feature vector can be reduced, thus reducing the amount of computation for calculating the similarity with the feature vector corresponding to the multimedia material to be processed and improving the efficiency of template recommendation as a whole.

In an optional implementation, first of all, the distribution smoothness degree of the feature value of each template in the preset template recommendation pool in the dimension of the target tag is determined. Then, the top K target tags with lower distribution smoothness degree are determined as recommended standard tags, wherein K is an integer greater than 0. It should be understood that the lower the distribution smoothness degree of the tag, the greater the difference in feature values between different templates, and the more reflective of the difference between templates. Therefore, the top K target tags with lower distribution smoothness degree may be selected as recommended standard tags, where K is an integer greater than 0.

In the embodiment of the present disclosure, the distribution smoothness degree may be selected according to a specific application scenario, including without limitation to, any of variance, standard deviation and mean deviation.

In an optional implementation, with respect to the target tag, a variance of the feature value of each template in the dimension of the target tag may be calculated, and the top K tags with greater variances may be determined as recommended standard tags based on the variance corresponding to the each tag. The top K tags with larger variances can characterize the difference between different templates.

After determining the recommended standard tag, the building the template feature vector corresponding to the candidate editing template based on the feature value of the candidate editing template in the dimension of the target tag at the above step 4 may comprise the following:

Based on the feature value of the candidate editing template corresponding to the recommended standard tag, building the template feature vector corresponding to the candidate editing template. Specifically, using the recommended standard tag as the target tag, the above steps 2-4 are sequentially performed to complete building the template feature vector corresponding to the candidate editing template.

In the embodiment of the present disclosure, after determining the K recommended standard tags, the template feature vector corresponding to each template is further determined, and then an N×K feature matrix is built based on each template feature vector, where N denotes the number of templates. Normalization processing is performed on the dimension corresponding to each column in the N×K feature matrix, where methods of the normalization processing include without limitation to, any of L1 normalization and softmax.

In an optional implementation, the feature vector corresponding to the multimedia material to be processed has a corresponding relation with each dimension of the template feature vector, the tag of the corresponding dimension is the same, and the total number of dimensions included is also the same. For example, if the first dimension of the feature vector corresponding to the multimedia material to be processed is the feature value of the tag "baby," then the first dimension of the template feature vector is also the feature value of the tag "baby."

To this end, after determining the recommended standard tag, the feature of the multimedia material to be processed may be obtained, which may be characterized by the feature vector corresponding to the multimedia material. Specifically, the following may be included:

First, a feature value of a multimedia material to be processed in the dimension of the recommended standard tag is determined based on a tag of the multimedia material to be processed. Then, based on the feature value of the multimedia material to be processed in the dimension of the recommended standard tag, a feature vector corresponding to the multimedia material to be processed is determined.

In the embodiment of the present disclosure, there may be various methods for determining the feature vector corresponding to the multimedia material to be processed, which may be selected according to a specific application scenario. The present embodiment is not intended to limit. There may include, without limitation, the following two methods:

Method 1: recommended standard tags corresponding to respective dimensions of the feature vector corresponding to the multimedia material to be processed may be determined in advance, and then, the feature value of a corresponding dimension may be determined based on whether the respective recommended standard tags exist among tags of the multimedia material to be processed. Specifically, if the recommended standard tag corresponding to a certain dimension exists among tags of the multimedia material to be processed, then the feature value of the dimension is determined as 1, or else 0, whereby a binarized feature vector corresponding to the multimedia material to be processed is obtained in turn.

For example, when the multimedia material to be processed includes an image material, a corresponding relation between the dimension of the feature vector corresponding to the multimedia material to be processed and the recommended standard tag may be determined in advance. Suppose the feature vector includes 3 dimensions, and recommended standard tags corresponding to the respective dimensions are as below: a recommended standard tag "baby" corresponding to a first dimension, a recommended standard tag "scenery" corresponding to a second dimension, and a recommended standard tag "sports" corresponding to a third dimension. Then, it is determined whether tags of the multimedia material to be processed include the above recommended standard tags corresponding to the respective dimensions. If tags of the multimedia material to be processed include tags "baby" and "scenery" without "sports," then the feature vector corresponding to the multimedia material to be processed is $[1, 1, 0]^T$.

Method 2: When the multimedia material to be processed includes multiple materials, a feature vector of the multimedia material to be processed may be determined based on the multiple materials. Recommended standard tags corresponding to the respective dimensions of the feature vector corresponding to the multimedia material to be processed may be determined in advance. Then, with respect to the recommended standard tag corresponding to the each dimension, a ratio of the number of materials containing the recommended standard tag in the multimedia material to be processed to the total number of materials is determined as the feature value of the dimension in the feature vector corresponding to the recommended standard tag. For example, suppose the multimedia material to be processed includes three materials, and tags of two of the three materials include the recommended standard tag corresponding to a certain dimension, then the feature value of the dimension is determined as ⅔. In this way, the feature vector corresponding to the multimedia material to be processed may be obtained.

For example, when the multimedia material to be processed includes multiple image materials, a corresponding relation between a dimension in the feature vector corresponding to the multiple material to be processed and a recommended standard tag may be determined in advance. Recommended standard tags corresponding to the respective dimensions are as below: a recommended standard tag "baby" corresponding to a first dimension, a recommended standard tag "scenery" corresponding to a second dimension, and a recommended standard tag "sports" corresponding to a third dimension. If among the multiple materials, tags a first material are "baby" and "scenery", tags in a second material are "baby" and "sports", and tags in a third material are "baby" and "scenery", then the feature vector corresponding to the multiple material to be processed is $[1, ⅔, ⅓]^T$.

Accordingly, after determining the feature vector corresponding to the multimedia material to be processed and the template feature vector corresponding to the candidate editing template, the similarity between the feature vector corresponding to the multimedia material to be processed and the template feature vector corresponding to the candidate editing template is calculated.

The feature vector corresponding to the multimedia material to be processed may characterize the feature of the multimedia material to be processed, and the template feature vector corresponding to the candidate editing template may characterize the feature of the candidate editing template. Therefore, the similarity between the feature vector of the multimedia material to be processed and the feature vector of the candidate editing template may be calculated, and then target editing template determined based on the similarity has a higher degree of match with the multimedia material to be processed, thereby improving the user's satisfaction with template recommendation.

It should be noted that there are various methods of calculating the similarity, and the present embodiment is not intended to limit, e.g., any one of Cosine similarity and European distance.

Specifically, in order to reduce the amount of computation of the similarity between the feature corresponding to the multimedia material to be processed and the feature corresponding to the candidate editing template, the candidate editing template may be filtered in advance based on the matching situation of attribute information.

Specifically, templates in the preset template recommendation pool may be filtered to obtain a candidate editing template based on attribute information of the multimedia material to be processed, where the attribute information includes material type, the number of materials, material duration and/or material aspect ratio.

It should be noted that the multimedia material to be processed usually has a plurality of attribute information. The attribute information may determines whether a template has the capability of processing the multimedia material to be processed, and the attribute information includes without limitation to, any one or more of material type, the number of materials, material duration and material aspect ratio. The embodiment of the present disclosure may filter templates in the preset template recommendation pool to obtain the candidate editing template based on the attribute information of the multimedia material to be processed. It should be understood that the candidate editing template may be used for processing the multimedia material to be processed.

For example, when the multimedia material to be processed includes multiple image materials, the material type in the attribute information of the multimedia material to be processed is image type, so templates in the preset template recommendation pool which fail to process the multimedia material to be processed will be filtered out, thereby obtaining the candidate editing template. That is, after the filtering, templates for which the material type in the attribute information does not include image type will be filtered out, while templates for which the material type in the attribute information includes image type will be retained and used as candidate editing templates for subsequent template recommendation.

In the embodiment of the present disclosure, after filtering templates in the preset template recommendation pool, the similarity may be calculated based on the feature corresponding to the resulting candidate editing template and the feature corresponding to the multimedia material to be processed, thereby reducing the amount of computation.

In the template recommendation method according to the embodiment of the present disclosure, by filtering templates in the preset template recommendation pool before calculating the similarity, templates that do not match with the attribute information of the multimedia material to be processed, thereby reducing the data amount for similarity calculation and improving the efficiency of template recommendation as a whole.

In an application scenario, the method for template recommendation provided by the embodiments of the present disclosure may be applied to a client, where the client includes but is not limited to, any one or more of a web client and a mobile client.

Figure 3:
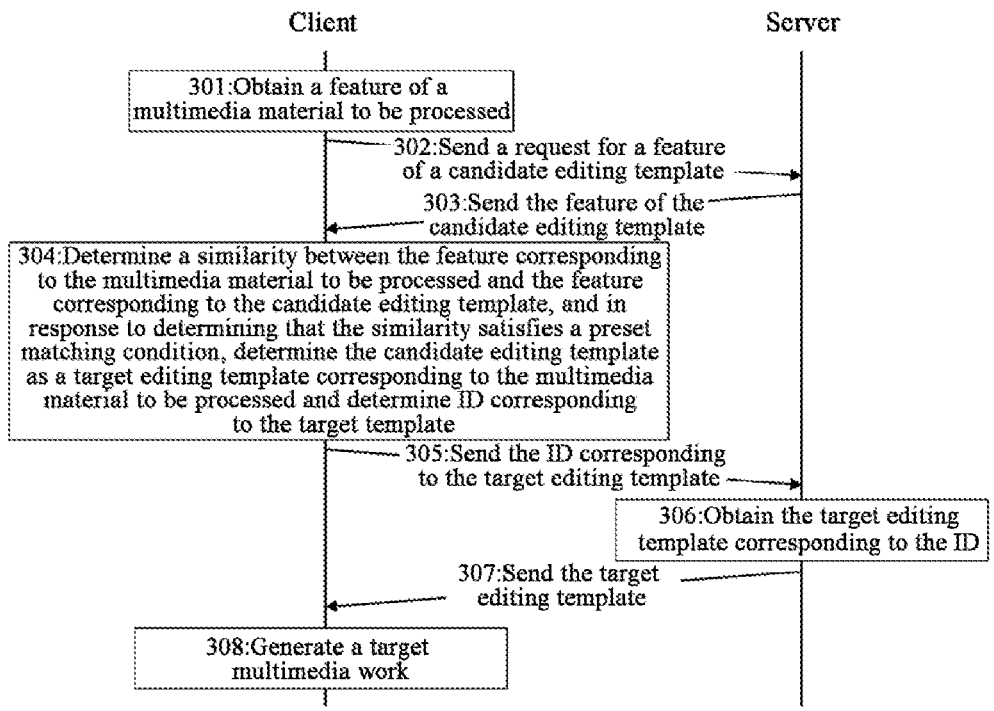
FIG. 3 is a data interaction diagram of a method for template recommendation provided by an embodiment of the present disclosure.

As shown in FIG. 3, this figure shows a data interaction diagram of a method for template recommendation provided by the embodiments of the present disclosure.

At step 301, the client obtains a feature of a multimedia material to be processed.

After determining a feature of a multimedia material to be processed, first a multimedia material to be processed is selected on a client by a user, and then the client extracts a feature of the multimedia material to be processed. Specifically, it is not intended to limit the way of extracting the feature of the multimedia material to be processed.

At step 302, the client sends to a server a request for requesting the server to send a feature corresponding to a latest-version candidate editing template.

At step 303, in response to the request from the client, the server sends the feature corresponding to the latest-version candidate editing template to the client.

At step 304, the client determines the similarity between the feature corresponding to the multimedia material to be processed and the feature corresponding to the candidate editing template, and in response to determining that the similarity satisfies a preset matching condition, determining the candidate editing template as a target editing template corresponding to the multimedia material to be processed.

ID (identity document) corresponding to the target editing template corresponding to the multimedia material to be processed is determined, the ID is used as a unique identity corresponding to the template. It may be understood that there may be one or more target editing templates. Therefore, there also may be one or more IDs corresponding to the target editing template as determined by the client.

At step 305, the client sends the ID corresponding to the target editing template to the server.

At step 306, after receiving the ID, the server obtains the target editing template corresponding to the ID.

At step 307, the server sends the target editing template to the client.

At step 308, the client generates a target multimedia material work.

When there is one target editing template, the client edits the multimedia material to be processed in an editing mode applied by the target editing template, to obtain the target multimedia material work.

When there are multiple target editing templates, multiple candidate editing templates may be presented to the user through the client, and the user may select a target editing template according to his/her preference. In response to the section operation on any of the multiple candidate editing templates, the client edits the multimedia material to be processed in an editing mode applied by the template corresponding to the selection operation, to obtain the target multimedia work.

In the embodiment of the present disclosure, the client presents target editing templates to the user, thereby providing the user with further independent selection, increasing the interactivity of template recommendation and improving the user experience.

In another application scenario, the method for template recommendation provided by the embodiments of the present disclosure may further be applied to a server.

Figure 4:
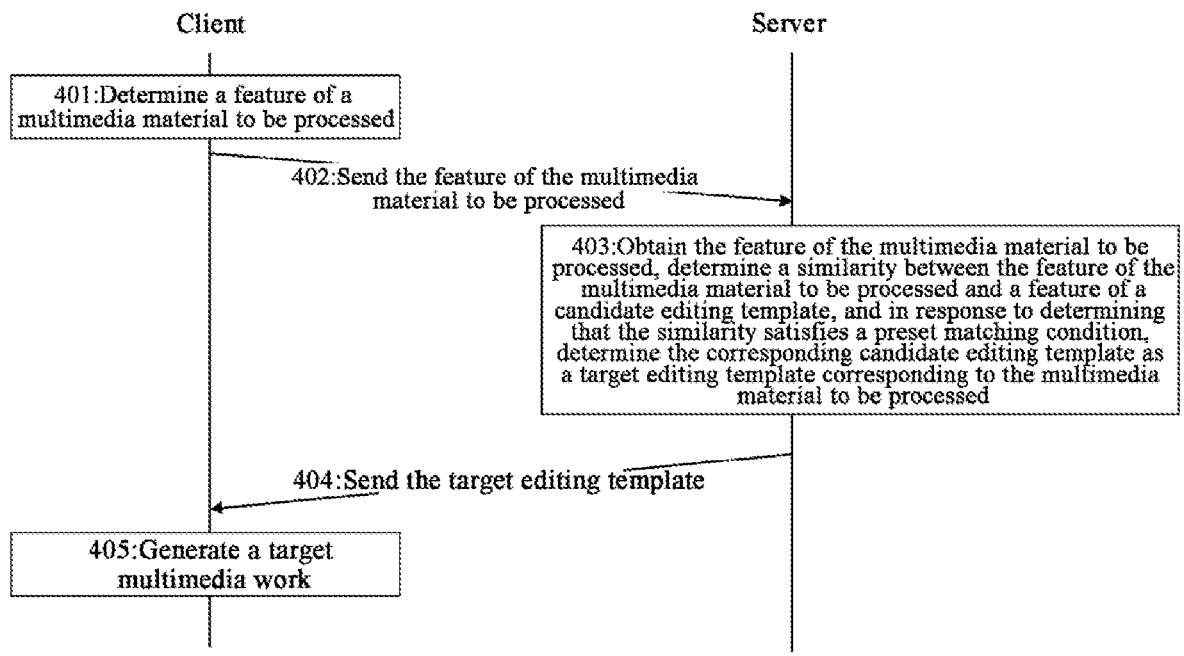
FIG. 4 is a data interaction diagram of another method for template recommendation provided by an embodiment of the present disclosure.

As shown in FIG. 4, this figure shows a data interaction diagram of another method for template recommendation provided by the embodiments of the present disclosure.

At step 401, a client determines a feature of a multimedia material to be processed, where the feature of the multimedia material to be processed may include a feature vector of the multimedia material to be processed or a tag of the multimedia material to be processed.

In practical applications, before obtaining a feature of a multimedia material to be processed, first the multimedia material to be processed is selected on the client by a user.

At step 402, the client sends the feature of the multimedia material to be processed to a server.

At step 403, the sever obtains the feature of the multimedia material to be processed from the client, determines the similarity between the feature of the multimedia material to be processed and a feature of a candidate editing template, and in response to determining that the similarity satisfies a preset matching condition, determines the corresponding candidate editing template as a target editing template corresponding to the multimedia material to be processed.

At step 404, the server sends the target editing template to the client.

At step 405, the client generates a target multimedia material work.

When there is one target editing template, the client edits the multimedia material to be processed in an editing mode applied by the target editing template, to obtain the target multimedia material work.

When there are multiple target editing templates, multiple candidate editing templates may be presented to the user through the client, and the user may select a target editing template according to his/her preference. In response to the section operation on any of the multiple candidate editing templates, the client generates the target multimedia work based on the selected template and the multimedia material to be processed.

The client may generate the target multimedia work based on the selected template and the multimedia material to be processed in the following manner: the client edits the multimedia material to be processed in an editing mode applied by the template corresponding to the selection operation, to obtain the target multimedia work.

It may be understood that the user does not need to upload the multimedia material to be processed to the server but uploads the feature of the multimedia material to be processed, e.g., the feature vector or the tag, thereby avoiding the leakage of user privacy data.

Figure 5:
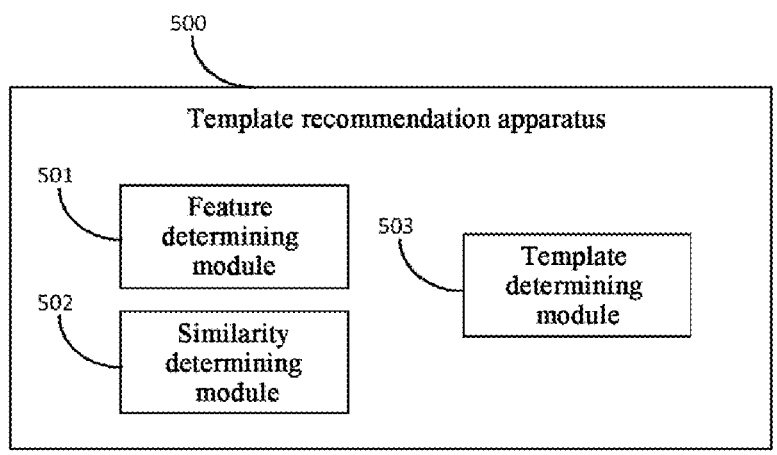
FIG. 5 is a schematic structural diagram of an apparatus for template recommendation provided by an embodiment of the present disclosure.

Based on the foregoing method embodiments, the present disclosure further provides an apparatus for template recommendation. As shown in FIG. 5, this figure shows a structural schematic diagram of an apparatus for template recommendation provided by the embodiments of the present disclosure, which apparatus may be implemented by software and/or hardware and usually may be integrated in an electronic device. As depicted, the apparatus for template recommendation 500 may comprise: a feature determining module 501, a similarity determining module 502, and a template determining module 503.

The feature determining module 501 is configured to obtain a feature of a multimedia material to processed, where the feature comprises a content feature of the multimedia material to be processed and/or a user attribute corresponding to the multimedia material to be processed.

The similarity determining module 502 is configured to determine a similarity between the feature corresponding to the multimedia material to be processed and a feature corresponding to a candidate editing template, where the feature corresponding to the candidate editing template is determined based on historical multimedia works, and the historical multimedia works are multimedia works edited in an editing mode applied by the candidate editing template.

The template determining module 503 is configured to determine, in response to determining that the similarity satisfies a preset matching condition, the candidate editing template as a target editing template corresponding to the multimedia material to be processed, where the target editing template is applied to edit the multimedia material to be processed into a target multimedia work in the editing mode.

Optionally, the apparatus for template recommendation further comprises: an obtaining module and a first determining module.

The obtaining module is configured to determine a candidate editing template and obtain a multimedia work collection corresponding to the candidate editing template, where the multimedia work collection comprises more historical multimedia works than a preset number;

The first determining module is configured to determine the feature corresponding to the candidate editing template based on content features of historical multimedia works in the multimedia work collection and/or user attributes corresponding to the historical multimedia works.

Optionally, the first determining module is further configured to: determine a target tag, where the target tag characterizes the content features of the historical multimedia works in the multimedia work collection and/or the user attributes corresponding to the historical multimedia works; determine a proportion of historical multimedia works having the target tag in the multimedia work collection corresponding to the candidate editing template; and determining a ratio of the proportion to an average proportion corresponding to the target tag as a feature value of the candidate editing template in a dimension of the target tag, where the feature value characterizes an applicability degree of the candidate editing template in the dimension of the target tag, and the average proportion represents an average value of proportions of historical multimedia works having the target tag in multimedia work collections corresponding to respective templates in a preset template recommendation pool; and building a template feature vector corresponding to the candidate editing template based on the feature value of the candidate editing template in the dimension of the target tag.

Optionally, the first determining module is further configured to: determine a distribution smoothness degree of feature values of respective templates in the preset template recommendation pool in the dimension of the target tag, where the distribution smoothness degree characterizes a difference degree among the respective templates in the preset template recommendation pool in the dimension of the target tag; and determine top K target tags with lower distribution smoothness degrees as recommended standard tags, where K is an integer greater than 0. Building the template feature vector corresponding to the candidate editing template based on the feature value of the candidate editing template in the dimension of the target tag comprises: building the template feature vector corresponding to the candidate editing template based on a feature value of the candidate editing template corresponding to the recommended standard tags.

Optionally, the first determining module is further configured to: determine a feature value of a multimedia material to be processed in the dimension of the recommended standard tag based on a tag of the multimedia material to be processed; and determine a feature vector corresponding to the multimedia material to be processed based on the feature value of the multimedia material to be processed in the dimension of the recommended standard tag. Determining the similarity between the feature corresponding to the multimedia material to be processed and the feature corresponding to the candidate editing template comprises: calculating a similarity between the feature vector corresponding to the multimedia material to be processed and the template feature vector corresponding to the candidate editing template.

Optionally, the apparatus for template recommendation further comprises: a filtering module, configured to filter templates in a preset template recommendation pool based on attribute information of the multimedia material to be processed to obtain a candidate editing template, where the attribute information comprises material type, material amount, material duration and/or material aspect ratio.

Optionally, the apparatus is applied on a client, the apparatus for template recommendation further comprising: a generating module configured to edit the multimedia material to be processed in an editing mode applied by the target editing template to obtain the target multimedia work.

Optionally, the apparatus for template recommendation further comprises: a presenting module configured to present a plurality of the candidate editing templates. The generating module is configured to edit, in response to the selection operation on any one of the plurality of candidate editing templates, the multimedia material to be processed in an editing mode applied by a template corresponding to the selection operation to obtain the target multimedia work.

The apparatus for template recommendation provided by the embodiments of the present disclosure may perform a method for template recommendation provided by any embodiment of the present disclosure, with corresponding functional modules and advantageous effects of performing the method.

Besides the foregoing method and apparatus, the embodiments of the present disclosure further provide a computer readable storage medium on which instructions are stored, the instructions, when running on a terminal device, causing the terminal device to perform the method for template recommendation of the embodiments of the present disclosure.

The embodiments of the present disclosure further provide a computer program product, comprising a computer program/instructions which, when executed by a processor, implementing the method for template recommendation provided by any embodiment of the present disclosure.

Figure 6:
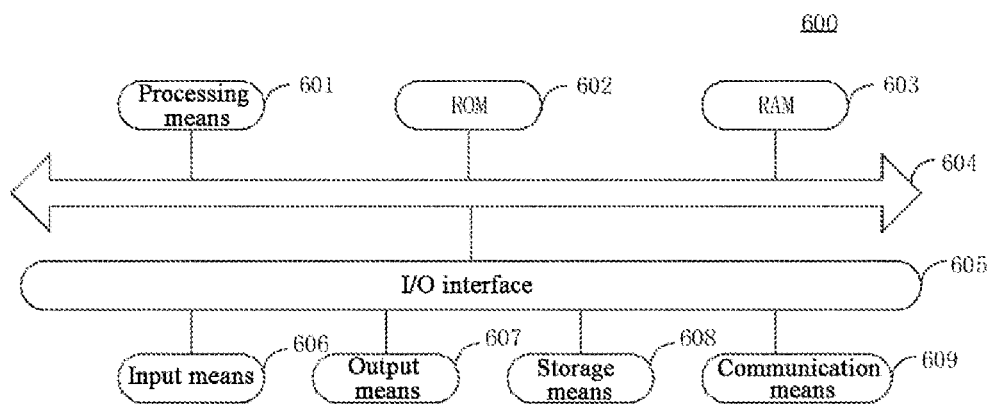
FIG. 6 is a schematic structural diagram of an electronic device provided by an embodiment of the present disclosure.

FIG. 6 is a structural schematic diagram of an electronic device provided by an embodiment of the present disclosure.

Reference is made to FIG. 6 below, which shows a structural schematic diagram of an electronic device 600 suitable for implementing the embodiments of the present disclosure. The terminal device 600 in the embodiments of the present disclosure may include, without limitation to, a mobile terminal such as a mobile phone, a laptop computer, a digital broadcast receiver, a PDA (personal digital assistant), a PAD (tablet computer), a PMP (portable multimedia player), an on-board terminal (e.g., on-board navigation terminal) and the like, as well as a fixed terminal such as a digital TV, a desktop computer and the like. The electronic device shown in FIG. 6 is merely an example and should not be construed to impose any limitations on the functionality and use scope of the embodiments of the present disclosure.

As shown in FIG. 6, the electronic device 600 may comprises processing means (e.g., a central processor, a graphics processor) 601 which is capable of performing various appropriate actions and processes in accordance with programs stored in a read only memory (ROM) 602 or programs loaded from storage means 308 to a random access memory (RAM) 603. In the RAM 603, there are also stored various programs and data required by the electronic device 600 when operating. The processing means 601, the ROM 602 and the RAM 603 are connected to one another via a bus 604. An input/output (I/O) interface 605 is also connected to the bus 604.

Usually, the following means may be connected to the I/O interface 605: input means 306 including a touch screen, a touch pad, a keyboard, a mouse, a camera, a microphone, an accelerometers, a gyroscope, or the like; output means 607, such as a liquid-crystal display (LCD), a loudspeaker, a vibrator, or the like; storage means 608, such as a magnetic tape, a hard disk or the like; and communication means 609. The communication means 609 allows the electronic device 600 to perform wireless or wired communication with other device so as to exchange data with other device. While FIG. 6 shows the electronic device 600 with various means, it should be understood that it is not required to implement or have all of the illustrated means. Alternatively, more or less means may be implemented or exist.

Specifically, according to the embodiments of the present disclosure, the procedures described with reference to the flowchart may be implemented as computer software programs. For example, the embodiments of the present disclosure comprise a computer program product that comprises a computer program embodied on a non-transitory computer-readable medium, the computer program including program codes for executing the method shown in the flowchart. In such an embodiment, the computer program may be loaded and installed from a network via the communication means 609, or installed from the storage means 608, or installed from the ROM 602. The computer program, when executed by the processing means 601, perform the above functions defined in the template recommendation method of the embodiments of the present disclosure.

It is noteworthy that the computer readable medium of the present disclosure can be a computer readable signal medium, a computer readable storage medium or any combination thereof. The computer readable storage medium may be, for example, but is not limited to, an electronic, magnetic, optical, electromagnetic, infrared or semiconductor system, apparatus or device, or any combination of the foregoing. More specific examples of the computer readable storage medium may include, without limitation to, the following: an electrical connection with one or more conductors, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the present disclosure, the computer readable storage medium may be any tangible medium including or storing a program that may be used by or in conjunction with an instruction executing system, apparatus or device. In the present disclosure, the computer readable signal medium may include data signals propagated in the baseband or as part of the carrier waveform, in which computer readable program code is carried. Such propagated data signals may take a variety of forms, including without limitation to electromagnetic signals, optical signals, or any suitable combination of the foregoing. The computer readable signal medium may also be any computer readable medium other than a computer readable storage medium that may send, propagate, or transmit a program for use by, or in conjunction with, an instruction executing system, apparatus, or device. The program code contained on the computer readable medium may be transmitted by any suitable medium, including, but not limited to, a wire, a fiber optic cable, RF (radio frequency), etc., or any suitable combination thereof.

In some implementations, the client and server may communicate utilizing any currently known or future developed network protocol such as HTTP (HyperText Transfer Protocol) and may be interconnected with digital data communications (e.g., communication networks) of any form or medium. Examples of communication networks include local area networks ("LANs"), wide area networks ("WANs"), inter-networks (e.g., the Internet), and end-to-end networks (e.g., ad hoc end-to-end networks), as well as any currently known or future developed networks.

The above computer readable medium may be contained in the above electronic device; or it may exist separately and not be assembled into the electronic device.

The above computer readable medium carries one or more programs which, when executed by the electronic device, cause the electronic device to: obtain a feature of a multimedia material to processed, where the feature comprises a content feature of the multimedia material to be processed and/or a user attribute corresponding to the multimedia material to be processed; determine a similarity between the feature corresponding to the multimedia material to be processed and a feature corresponding to a candidate editing template, where the feature corresponding to the candidate editing template is determined based on historical multimedia works, and the historical multimedia works are multimedia works edited in an editing mode applied by the candidate editing template; determine, in response to determining that the similarity satisfies a preset matching condition, the candidate editing template as a target editing template corresponding to the multimedia material to be processed, where the target editing template is applied to edit the multimedia material to be processed into a target multimedia work in the editing mode. According to the embodiments of the present disclosure, the target editing template determined according to the similarity between the feature corresponding to the multimedia material to be processed and the feature corresponding to the candidate editing template has a higher degree of match with the multimedia material to be processed, thereby improving the user's satisfaction with template recommendation.

Computer program code for carrying out operations of the present disclosure may be written in one or more program designing languages or a combination thereof, which include without limitation to an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Units involved in the embodiments of the present disclosure as described may be implemented in software or hardware. The name of a unit does not form any limitation on the module itself.

The functionality described above may at least partly be performed, at least in part, by one or more hardware logic components. For example and in a non-limiting sense, exemplary types of hardware logic components that can be used include: field-programmable gate arrays (FPGA), application specific integrated circuits (ASICs), application specific standard products (ASSPs), systems on chips (SOCs), complex programmable logic devices (CPLDs), etc.

In the context of the present disclosure, the machine readable medium may be a tangible medium that can retain and store programs for use by or in conjunction with an instruction execution system, apparatus or device. The machine readable medium of the present disclosure can be a machine readable signal medium or a machine readable storage medium. The machine readable medium may include, but is not limited to, an electronic, magnetic, optical, electromagnetic, infrared or semiconductor system, apparatus or device, or any combination of the foregoing. More specific examples of the machine readable storage medium may include, without limitation to, the following: an electrical connection based on one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing.

The foregoing description is merely illustration of the preferred embodiments of the present disclosure and the technical principles used herein. Those skilled in the art should understand that the disclosure scope involved therein is not limited to the technical solutions formed from a particular combination of the above technical features, but should also cover other technical solutions formed by any combination of the above technical features or their equivalent features without departing from the above disclosure concepts, e.g., technical solutions formed by replacing the above features with technical features having similar functions disclosed (without limitation) in the present disclosure.

In addition, although various operations have been depicted in a particular order, it should not be construed as requiring that the operations be performed in the particular order shown or in sequential order of execution. Multitasking and parallel processing may be advantageous in certain environments. Likewise, although the foregoing discussion includes several specific implementation details, they should not be construed as limiting the scope of the present disclosure. Some features described in the context of separate embodiments may also be realized in combination in a single embodiment. On the contrary, various features described in the context of a single embodiment may also be realized in multiple embodiments, either individually or in any suitable sub-combinations.

While the present subject matter has been described using language specific to structural features and/or method logic actions, it should be understood that the subject matter defined in the appended claims is not necessarily limited to the particular features or actions described above. On the contrary, the particular features and actions described above are merely exemplary forms of realizing the claims. With respect to the apparatus in the above embodiment, the specific manner in which each module performs an operation has been described in detail in the embodiments relating to the method, and will not be detailed herein.

We claim:

1. A method for template recommendation, comprising:
obtaining a feature of a multimedia material to be processed, wherein the feature comprises a content feature of the multimedia material to be processed and a user attribute corresponding to the multimedia material to be processed, and the user attribute is obtained by analyzing a user who selects the multimedia material to be processed;
determining a similarity between the feature corresponding to the multimedia material to be processed and a feature corresponding to a candidate editing template, wherein the feature corresponding to the candidate editing template is determined based on a tag of historical multimedia works, the historical multimedia works are multimedia works edited in an editing mode applied by the candidate editing template, and the tag of the historical multimedia works comprises content features of the historical multimedia works and user attributes corresponding to the historical multimedia works; and
in response to determining that the similarity satisfies a preset matching condition, determining the candidate editing template as a target editing template corresponding to the multimedia material to be processed, wherein the target editing template is applied to edit the multimedia material to be processed into a target multimedia work in the editing mode;
wherein before determining the similarity between the feature corresponding to the multimedia material to be processed and the feature corresponding to the candidate editing template, the method further comprises:
filtering templates in a preset template recommendation pool based on attribute information of the multimedia material to be processed, to obtain a candidate editing template, wherein the attribute information comprises at least one of: material type, material amount, material duration, or material aspect ratio, and the preset template recommendation pool comprises templates determined based on at least one of: a number of historical multimedia works, a like count of historical multimedia works, or a playback count of historical multimedia works corresponding to the templates.

2. The method according to claim 1, wherein before determining the similarity between the feature corresponding to the multimedia material to be processed and the feature corresponding to a candidate editing template, the method further comprises:
determining the candidate editing template, and obtaining a multimedia work collection corresponding to the candidate editing template, wherein the multimedia work collection comprises more historical multimedia works than a preset number; and
determining the feature corresponding to the candidate editing template based on at least one of: content features of historical multimedia works in the multimedia work collection, or user attributes corresponding to the historical multimedia works.

3. The method according to claim 2, wherein a template feature vector of the candidate editing template comprises a plurality of dimensions, and determining the feature corresponding to the candidate editing template based on at least one of: content features of the historical multimedia works in the multimedia work collection, or user attributes corresponding to the historical multimedia works comprises:
determining a tag corresponding to an individual dimension of the plurality of dimensions of the template feature vector of the candidate editing template as a target tag, wherein the target tag characterizes at least one of: the content features of the historical multimedia works in the multimedia work collection, or the user attributes corresponding to the multimedia works;
determining a proportion of historical multimedia works having the target tag in the multimedia work collection corresponding to the candidate editing template;
determining a ratio of the proportion to an average proportion corresponding to the target tag as a feature value of the candidate editing template in the individual dimension corresponding to the target tag, wherein the feature value characterizes an applicability degree of the candidate editing template in terms of the individual dimension corresponding to the target tag, and the average proportion represents an average value of proportions of historical multimedia works having the target tag in multimedia work collections corresponding to respective templates in the preset template recommendation pool; and
building a template feature vector corresponding to the candidate editing template based on the feature value of the candidate editing template in the individual dimension corresponding to the target tag.

4. The method according to claim 3, wherein before building the template feature vector corresponding to the candidate editing template based on the feature value of the candidate editing template in the individual dimension corresponding to the target tag, the method further comprises:
determining a distribution smoothness degree of feature values of respective templates in the preset template recommendation pool in the individual dimension corresponding to the target tag, wherein the distribution smoothness degree characterizes a difference degree among the respective templates in the preset template recommendation pool in the individual dimension corresponding to the target tag; and
determining top K target tags with lower distribution smoothness degrees as recommended standard tags, wherein K is an integer greater than 0; and
wherein building a template feature vector corresponding to the candidate editing template based on the feature value of the candidate editing template in the individual dimension corresponding to the target tag comprises:
building the template feature vector corresponding to the candidate editing template based on a feature value of the candidate editing template corresponding to the recommended standard tags.

5. The method according to claim 4, wherein obtaining a feature of the multimedia material to be processed comprises:
  determining a feature value of the multimedia material to be processed in a dimension of the recommended standard tags based on a tag of the multimedia material to be processed; and
  determining a feature vector corresponding to the multimedia material to be processed based on the feature value of the multimedia material to be processed in the dimension of the recommended standard tags; and
  wherein determining the similarity between the feature corresponding to the multimedia material to be processed and the feature corresponding to the candidate editing template comprises:
  calculating a similarity between the feature vector corresponding to the multimedia material to be processed and the template feature vector corresponding to the candidate editing template.

6. The method according to claim 1, wherein the method is applied on a client, and after in response to determining that the similarity satisfies the preset matching condition, determining the candidate editing template as the target editing template corresponding to the multimedia material to be processed, the method further comprises:
  editing the multimedia material to be processed in an editing mode applied by the target editing template to obtain the target multimedia work.

7. The method according to claim 6, wherein the target editing template comprises a plurality of candidate editing templates, and before editing the multimedia material to be processed in the editing mode applied by the target editing template to obtain the target multimedia work, the method further comprises:
  presenting the plurality of candidate editing templates; and
  wherein editing the multimedia material to be processed in the editing mode applied by the target editing template to obtain the target multimedia work comprises:
  in response to performing selection operation on any one of the plurality of candidate editing templates, editing the multimedia material to be processed in an editing mode applied by a template corresponding to the selection operation to obtain the target multimedia work.

8. An electronic device, comprising:
  a processor; and
  a memory, configured to store instructions executable by the processor;
  the processor configured to read the executable instructions from the memory and execute the instructions and configured to:
  obtain a feature of a multimedia material to be processed, wherein the feature comprises a content feature of the multimedia material to be processed and a user attribute corresponding to the multimedia material to be processed, and the user attribute is obtained by analyzing a user who selects the multimedia material to be processed;
  determine a similarity between the feature corresponding to the multimedia material to be processed and a feature corresponding to a candidate editing template, wherein the feature corresponding to the candidate editing template is determined based on a tag of historical multimedia works, the historical multimedia works are multimedia works edited in an editing mode applied by the candidate editing template, and the tag of the historical multimedia works comprises content features of the historical multimedia works and user attributes corresponding to the historical multimedia works; and
  in response to determining that the similarity satisfies a preset matching condition, determine the candidate editing template as a target editing template corresponding to the multimedia material to be processed, wherein the target editing template is applied to edit the multimedia material to be processed into a target multimedia work in the editing mode;
  wherein before determining the similarity between the feature corresponding to the multimedia material to be processed and the feature corresponding to the candidate editing template, the method further comprises:
  filtering templates in a preset template recommendation pool based on attribute information of the multimedia material to be processed, to obtain a candidate editing template, wherein the attribute information comprises at least one of: material type, material amount, material duration, or material aspect ratio, and the preset template recommendation pool comprises templates determined based on at least one of: a number of historical multimedia works, a like count of historical multimedia works, or a playback count of historical multimedia works corresponding to the templates.

9. The electronic device according to claim 8, wherein the processor is further configured to: before determining the similarity between the feature corresponding to the multimedia material to be processed and the feature corresponding to a candidate editing template,
  determine the candidate editing template, and obtain a multimedia work collection corresponding to the candidate editing template, wherein the multimedia work collection comprises more historical multimedia works than a preset number; and
  determine the feature corresponding to the candidate editing template based on at least one of: content features of historical multimedia works in the multimedia work collection, or user attributes corresponding to the historical multimedia works.

10. The electronic device according to claim 9, wherein a template feature vector of the candidate editing template comprises a plurality of dimensions, and the processor is configured to determine the feature corresponding to the candidate editing template based on at least one of: content features of the historical multimedia works in the multimedia work collection, or user attributes corresponding to the historical multimedia works in the following manner:
  determining a tag corresponding to an individual dimension of the plurality of dimensions of the template feature vector of the candidate editing template as a target tag, wherein the target tag characterizes at least one of: the content features of the historical multimedia works in the multimedia work collection, or the user attributes corresponding to the multimedia works;
  determining a proportion of historical multimedia works having the target tag in the multimedia work collection corresponding to the candidate editing template;
  determining a ratio of the proportion to an average proportion corresponding to the target tag as a feature value of the candidate editing template in the individual dimension corresponding to the target tag, wherein the feature value characterizes an applicability degree of the candidate editing template in terms of the individual dimension corresponding to the target tag, and the average proportion represents an average value of proportions of historical multimedia works having the target tag in multimedia work collections corresponding to respective templates in the preset template recommendation pool; and building a template feature vector corresponding to the candidate editing template based on the feature value of the candidate editing template in the individual dimension corresponding to the target tag.

11. The electronic device according to claim 10, wherein the processor is further configured to: before building the template feature vector corresponding to the candidate editing template based on the feature value of the candidate editing template in individual dimension corresponding to the target tag, determining a distribution smoothness degree of feature values of respective templates in the preset template recommendation pool in the individual dimension corresponding to the target tag, wherein the distribution smoothness degree characterizes a difference degree among the respective templates in the preset template recommendation pool in the individual dimension corresponding to the target tag; and determining top K target tags with lower distribution smoothness degrees as recommended standard tags, wherein K is an integer greater than 0; and wherein building a template feature vector corresponding to the candidate editing template based on the feature value of the candidate editing template in the individual dimension corresponding to the target tag comprises:

building the template feature vector corresponding to the candidate editing template based on a feature value of the candidate editing template corresponding to the recommended standard tags.

12. The electronic device according to claim 11, wherein the processor is configured to obtain a feature of the multimedia material to be processed in the following manner:

determining a feature value of the multimedia material to be processed in a dimension of the recommended standard tags based on a tag of the multimedia material to be processed; and determining a feature vector corresponding to the multimedia material to be processed based on the feature value of the multimedia material to be processed in the dimension of the recommended standard tags; and wherein determining the similarity between the feature corresponding to the multimedia material to be processed and the feature corresponding to the candidate editing template comprises:

calculating a similarity between the feature vector corresponding to the multimedia material to be processed and the template feature vector corresponding to the candidate editing template.

13. The electronic device according to claim 8, wherein the processor is further configured to: after in response to determining that the similarity satisfies the preset matching condition, determining the candidate editing template as the target editing template corresponding to the multimedia material to be processed, edit the multimedia material to be processed in an editing mode applied by the target editing template to obtain the target multimedia work.

14. The electronic device according to claim 13, wherein the target editing template comprises a plurality of candidate editing templates, and the processor is further configured to: before editing the multimedia material to be processed in the editing mode applied by the target editing template to obtain the target multimedia work, present the plurality of candidate editing templates; and wherein editing the multimedia material to be processed in the editing mode applied by the target editing template to obtain the target multimedia work comprises:

in response to performing selection operation on any one of the plurality of candidate editing templates, editing the multimedia material to be processed in an editing mode applied by a template corresponding to the selection operation to obtain the target multimedia work.

15. A non-transitory computer readable storage medium, wherein instructions are stored in the computer readable storage medium, the instructions, when running on a terminal device, causing the terminal device to perform:

obtaining a feature of a multimedia material to be processed, wherein the feature comprises a content feature of the multimedia material to be processed and a user attribute corresponding to the multimedia material to be processed, and the user attribute is obtained by analyzing a user who selects the multimedia material to be processed;

determining a similarity between the feature corresponding to the multimedia material to be processed and a feature corresponding to a candidate editing template, wherein the feature corresponding to the candidate editing template is determined based on a tag of historical multimedia works, the historical multimedia works are multimedia works edited in an editing mode applied by the candidate editing template, and the tag of the historical multimedia works comprises content features of the historical multimedia works and user attributes corresponding to the historical multimedia works; and in response to determining that the similarity satisfies a preset matching condition, determining the candidate editing template as a target editing template corresponding to the multimedia material to be processed, wherein the target editing template are applied to edit the multimedia material to be processed into a target multimedia work in the editing mode;

wherein before determining the similarity between the feature corresponding to the multimedia material to be processed and the feature corresponding to the candidate editing template, the method further comprises:

filtering templates in a preset template recommendation pool based on attribute information of the multimedia material to be processed, to obtain a candidate editing template, wherein the attribute information comprises at least one of: material type, material amount, material duration, or material aspect ratio, and the preset template recommendation pool comprises templates determined based on at least one of: a number of historical multimedia works, a like count of historical multimedia works, or a playback count of historical multimedia works corresponding to the templates.

16. The non-transitory computer readable storage medium according to claim 15, wherein before determining the similarity between the feature corresponding to the multimedia material to be processed and the feature corresponding to a candidate editing template, the method further comprises:

determining the candidate editing template, and obtaining a multimedia work collection corresponding to the candidate editing template, wherein the multimedia work collection comprises more historical multimedia works than a preset number, and determining the feature corresponding to the candidate editing template based on at least one of: content features of historical multimedia works in the multimedia work collection, or user attributes corresponding to the historical multimedia works.

17. The non-transitory computer readable storage medium according to claim 16, wherein a template feature vector of the candidate editing template comprises a plurality of dimensions, and determining the feature corresponding to the candidate editing template based on at least one of: content features of the historical multimedia works in the multimedia work collection, or user attributes corresponding to the historical multimedia works comprises:

- determining a tag corresponding to an individual dimension of the plurality of dimensions of the template feature vector of the candidate editing template as a target tag, wherein the target tag characterizes at least one of: the content features of the historical multimedia works in the multimedia work collection, or the user attributes corresponding to the multimedia works;
- determining a proportion of historical multimedia works having the target tag in the multimedia work collection corresponding to the candidate editing template;
- determining a ratio of the proportion to an average proportion corresponding to the target tag as a feature value of the candidate editing template in the individual dimension corresponding to the target tag, wherein the feature value characterizes an applicability degree of the candidate editing template in terms of the individual dimension corresponding to the target tag, and the average proportion represents an average value of proportions of historical multimedia works having the target tag in multimedia work collections corresponding to respective templates in the preset template recommendation pool; and
- building a template feature vector corresponding to the candidate editing template based on the feature value of the candidate editing template in the individual dimension corresponding to the target tag.

18. The non-transitory computer readable storage medium according to claim 17, wherein before building the template feature vector corresponding to the candidate editing template based on the feature value of the candidate editing template in the individual dimension corresponding to the target tag, the method further comprises:

- determining a distribution smoothness degree of feature values of respective templates in the preset template recommendation pool in the individual dimension corresponding to the target tag, wherein the distribution smoothness degree characterizes a difference degree among the respective templates in the preset template recommendation pool in the individual dimension corresponding to the target tag; and
- determining top K target tags with lower distribution smoothness degrees as recommended standard tags, wherein K is an integer greater than 0; and
- wherein building a template feature vector corresponding to the candidate editing template based on the feature value of the candidate editing template in the individual dimension corresponding to the target tag comprises:
- building the template feature vector corresponding to the candidate editing template based on a feature value of the candidate editing template corresponding to the recommended standard tags.

* * * * *